United States Patent Office 3,605,504
Patented Sept. 20, 1971

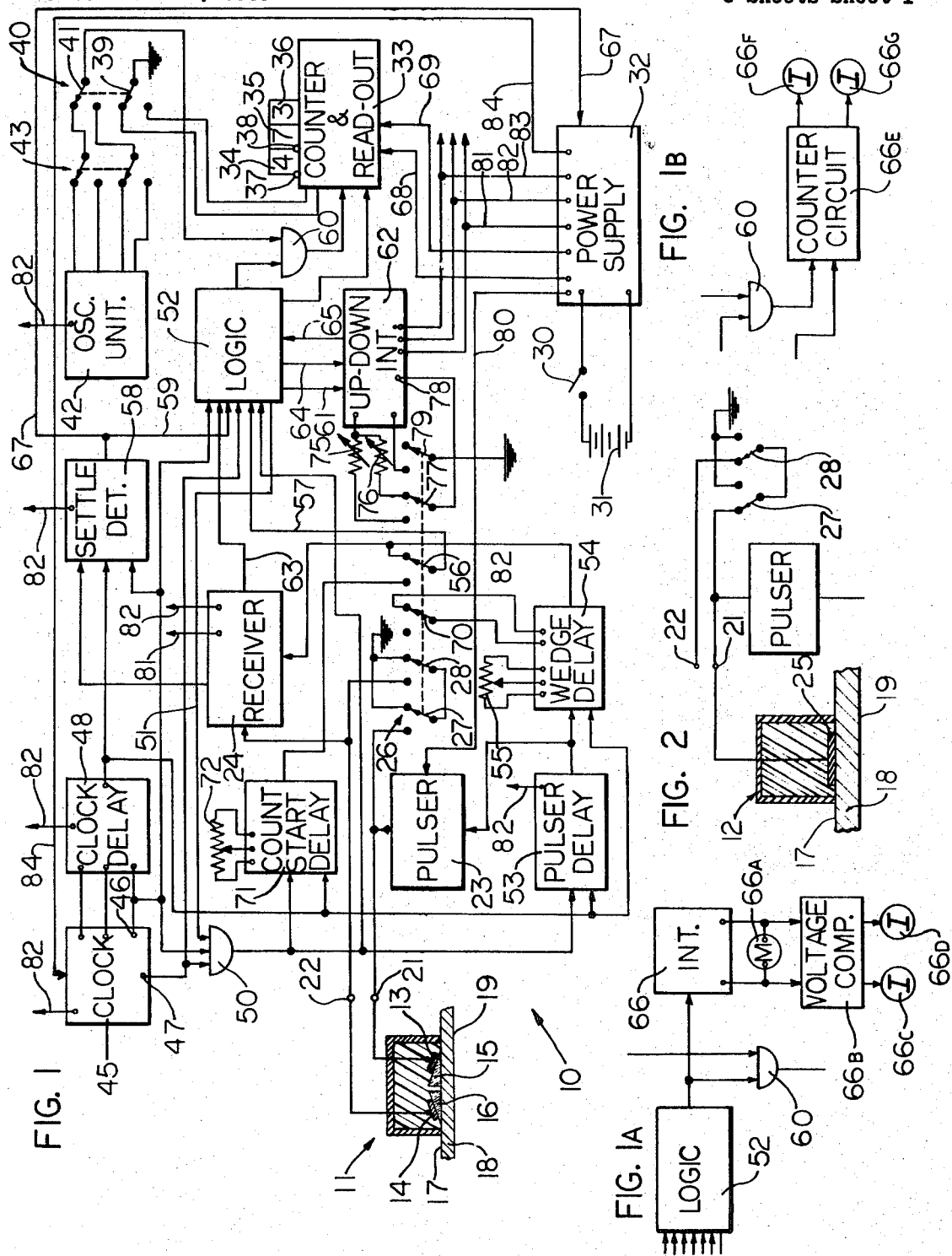

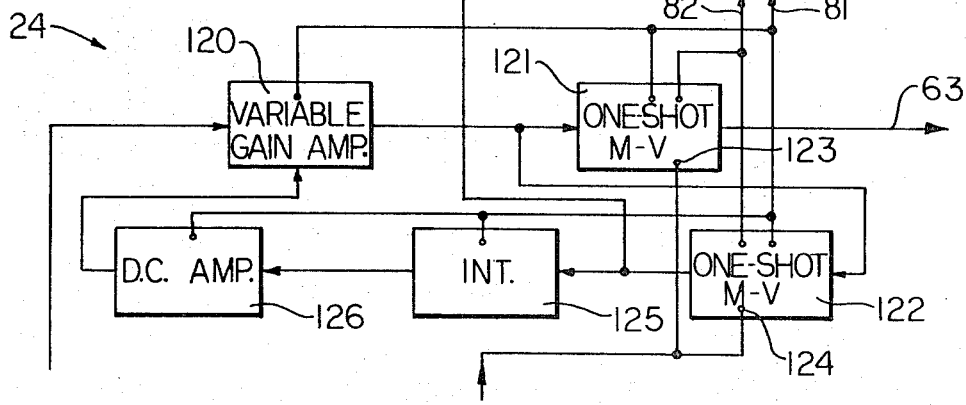
FIG. 5
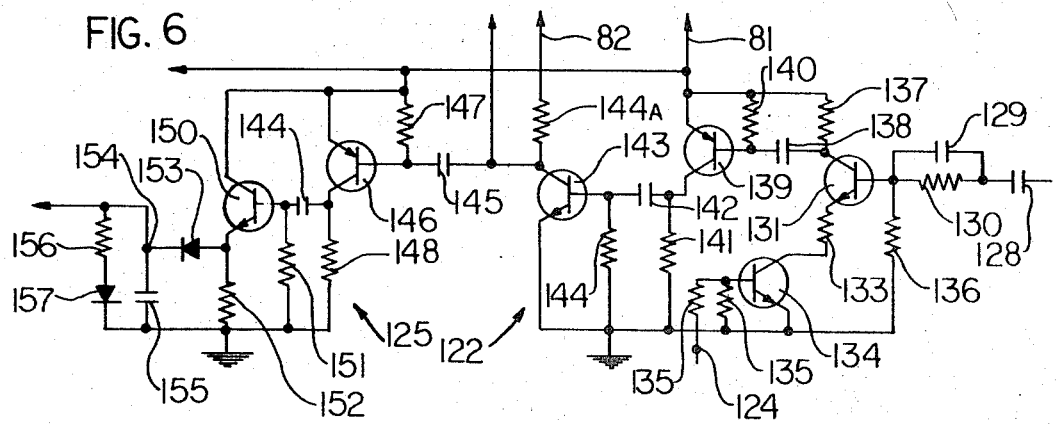
FIG. 6
FIG. 7

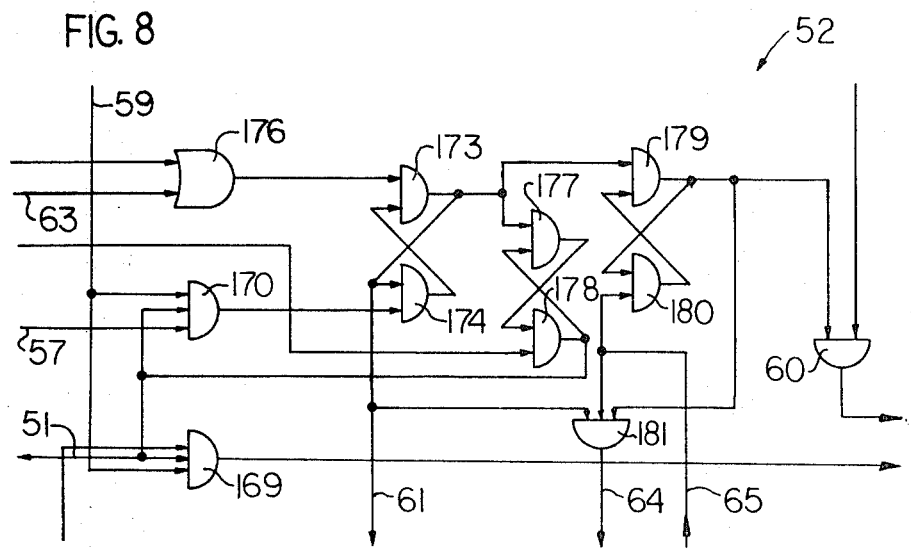
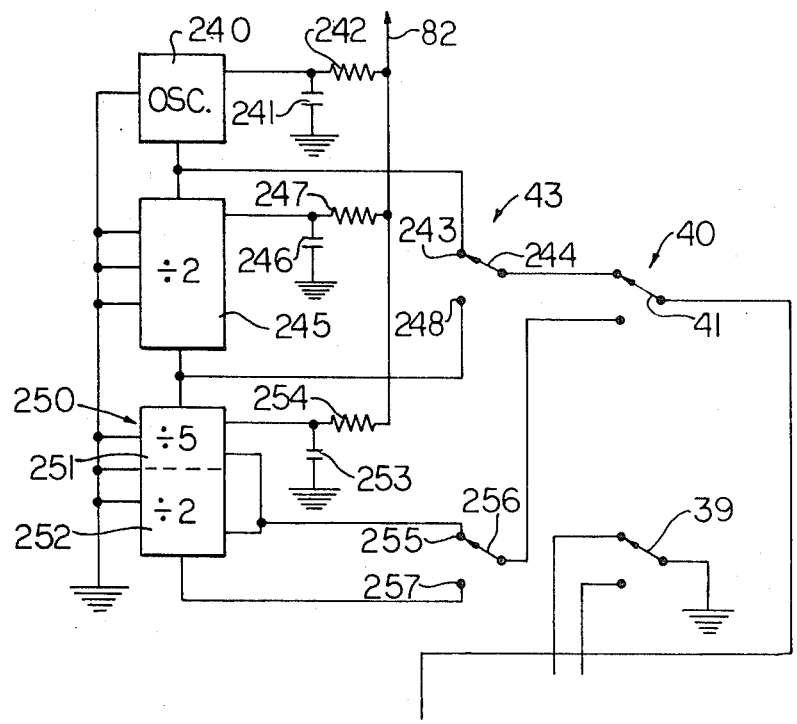

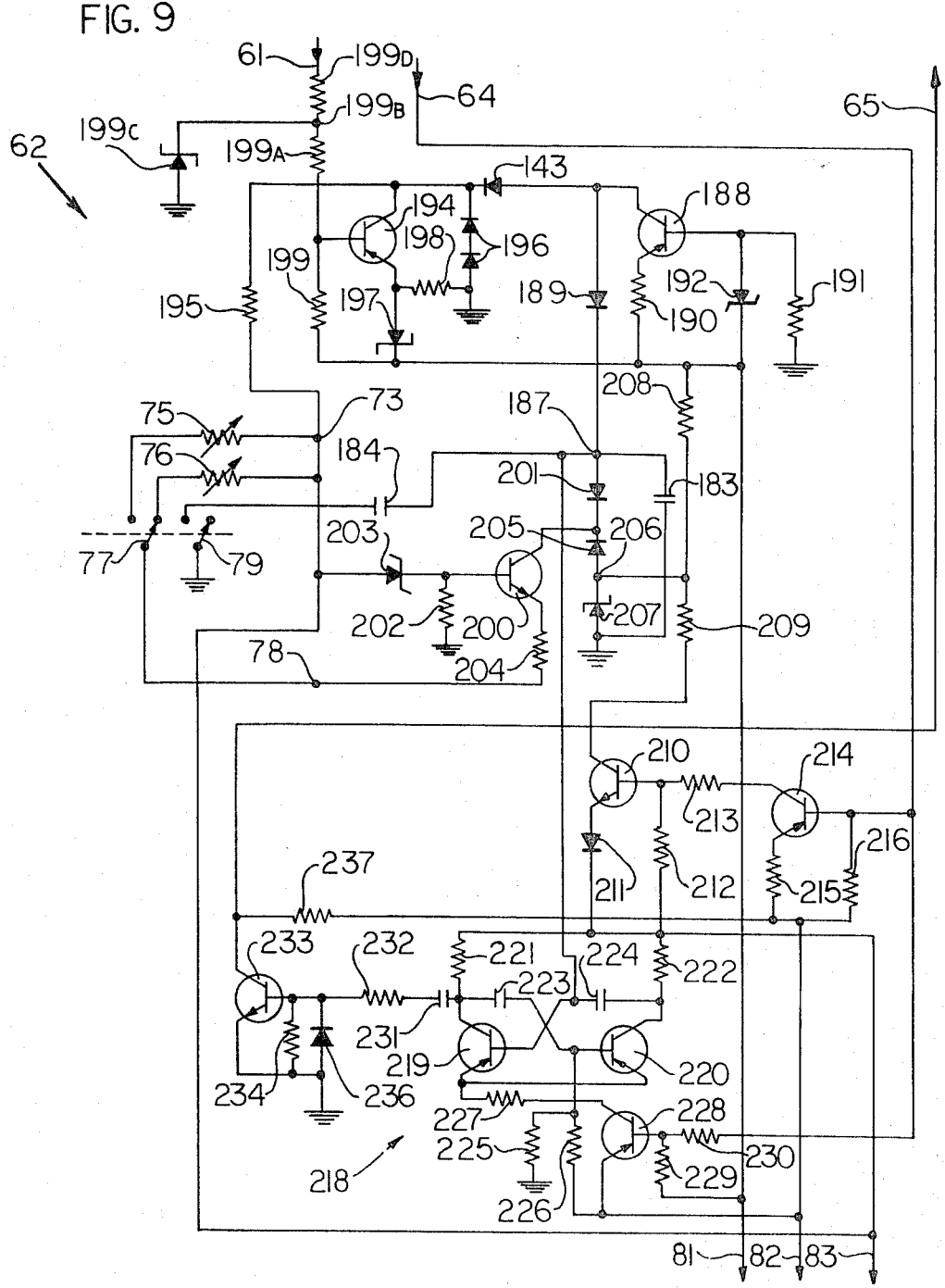

3,605,504
ULTRASONIC THICKNESS MEASURING SYSTEM
George L. Kummer, Jr., Mount Prospect, Ronald A. Straw, Aurora, and John A. Wendt, Park Ridge, Ill., assignors to Magnaflux Corporation, Chicago, Ill.
Filed Feb. 28, 1969, Ser. No. 803,165
Int. Cl. G01b 17/02
U.S. Cl. 73—67.7                    19 Claims

ABSTRACT OF THE DISCLOSURE

Ultrasonic thickness measuring system in which bursts of ultrasonic energy are transmitted into a front surface of a part with received signals being developed from reflections from the back surface of a part, the time interval between a transmitted burst and a corresponding received signal being measured electronically, preferably by digital means. An important feature is in the provision of means for automatically controlling the gain of an amplifier to develop amplified received signals of constant amplitude in response to back reflections of varying amplitude which permits much more accurate measurement. Another important feature is in the provision of an integrator for producing a control signal having a duration directly proportional to and at least several times larger than the time interval between a burst and the corresponding reflection, which permits much more accurate measurement with a practical design of time measuring means. The integrator may comprise a means for charging a capacitor at a uniform rate during the time interval between a burst and the corresponding reflection and for discharging the capacitor at a uniform but much slower rate. A further feature relates to the operation of the time interval measuring means periodically at a slow rate such that the maximum duration of the time interval measured is a small fraction of the time between operations of the measuring means, which conserves power and is otherwise advantageous.

---

This invention relates to an ultrasonic thickness measuring system and more particularly to an ultrasonic thickness measuring system which is extremely accurate and reliable in operation and in which a wide range of thicknesses can be measured.

Ultrasonic thickness measuring systems of various types have heretofore been provided for determining the thickness between generally parallel front and back surfaces of a part, by transmission of energy into the front surface of the part to be reflected from the back surface of the part, with the time interval between the transmission into the front surface and the reflection from the back surface being measured. Such systems have been generally satisfactory for many purposes, but have not achieved the degree of accuracy which is desired in many applications. Also, such systems have not been capable of measuring a wide range of thicknesses and in most cases, have been quite bulky and not easily portable.

This invention was evolved with the general object of overcoming the disadvantages of prior art systems and of providing a system which is extremely accurate and reliable while being capable of measuring a wide range of thicknesses and while being relatively compact and portable.

Another object of the invention is to provide a thickness measuring system having a digital read-out with counting rates being such that the simplest and most economical forms of electronic counting circuits and devices are usable.

In accordance with this invention, a system is provided in which bursts of ultrasonic energy are transmitted into a part with received signals being developed in response to the bursts after travel in the part, as by reflection from a back surface of the part. Electronic time interval measuring means are provided for measuring the elapsed time between the transmission of a burst and the corresponding received signal. The time interval measuring means preferably comprises a high frequency oscillator for supplying pulses of fixed frequency through a gate to a digital counter, a control signal being applied to the gate having a duration proportional to the time interval between the transmission of a burst and the reception of a corresponding received signal.

Important features of the invention relate to the provision of means for automatically controlling the gain of an amplifier to develop amplified received signals of constant amplitude in response to back reflections of varying amplitude. It is found that this feature results in the attainment of much greater accuracy in the measurement which is due to the fact that if the amplified received signals have the same variation in amplitude as the back reflections, the extact timing of the signals cannot be accurately determined.

Additional important features of the invention relate to the provision of an integrator circuit responsive to a timing signal synchronized with a transmitted burst and a corresponding received signal for producing a control signal having a duration directly proportional to and at least several times larger than the time between the timing signal and the corresponding received signal, the duration of the control signal being measured. With these features, a much more accurate measurement is possible with practical forms of time measuring means, these features being particularly advantageous in combination with the use of digital means for measuring the duration of the control signal.

Further important features of the invention relate to the operation of time interval measuring means periodically at a slow rate such that the maximum duration of the time interval between a transmitted burst and the corresponding received signal is a small fraction of the time between operations of the time interval measuring means. With this feature the time interval measuring means is operative only a very small fraction of the time, and power requirements are conserved. This is very important when the system is embodied in a portable battery-powered instrument and it is also important in combination with the use of digital time measuring means which require relatively large amounts of power for operation. The rate of operation of the time interval measuring means may preferably be on the order of 4 Hz. and by reason of the low repetition rate, it is preferred to as a "burp" method.

It is important to note that the automatic gain control feature, the integrator circuit feature and the "burp" method of repetition rate are important in combination because all three features contribute to the attainment of a compact, economical and accurate instrument having a digital read-out and having low power consumption.

Specific features of the invention relate to the form of the automatic gain control circuitry, in which a monostable multivibrator is triggered at a certain threshold level to develop pulses which are integrated for control of the gain of the amplifier, with the absence of pulses from the multivibrator being used to indicate when a stabilized gain has been obtained.

Additional important features of the invention relate to the form of the integrator circuit in which a capacitor is charged at a uniform rate during the time interval between a transmitted burst and the corresponding received signal and is then discharged at a uniform rate which is much slower than the charging rate. With these features, a pulse is developed having a long duration which is accurately proportional to the time interval between a transmitted burst and the corresponding received signal.

Further specific features relate to the circuitry for obtaining the "burp" method of repetition rate and for otherwise obtaining accurate and reliable operation with minimum power required for operation.

This invention contemplates other objects, features and advantages which will become more fully apparent from the following detailed description taken in conjunction with the accompanying drawings which illustrate preferred embodiments and in which:

FIG. 1 is a block diagram of an ultrasonic thickness measuring system constructed in accordance with the principles of this invention, the use of a dual transducer unit being illustrated;

FIG. 1A is a diagram showing additional circuitry which may be either added to the circuit of FIG. 1 or substituted for a digital read-out thereof;

FIG. 1B is a diagram showing further additional circuitry which can be used in the circuit of FIG. 1;

FIG. 2 is a view illustrating a single transducer unit and the connection thereof to the system as shown in FIG. 1;

FIG. 5 is a block diagram of an automatic gain control receiver of the system of FIG. 1;

FIG. 6 is a circuit diagram of a one-shot multivibrator and an integrator circuit of the receiver shown in block form in FIG. 5;

FIG. 7 is a diagram of a settle detector circuit of the system of FIG. 1;

FIG. 8 is a diagram of a logic circuit of the system of FIG. 1;

FIG. 9 is a circuit diagram of an up-down integrator circuit of the system of FIG. 1; and FIG. 10 is a diagram of an oscillator circuit of the system of FIG. 1.

Figure 3:
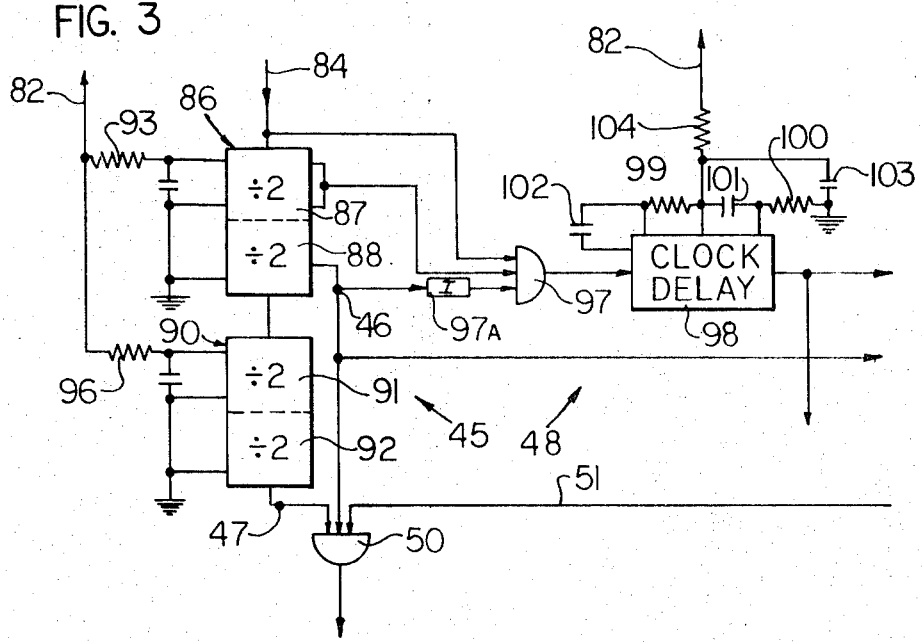
FIG. 3 is a diagram of a clock circuit and a clock delay circuit of the system of FIG. 1.

Reference numeral 10 generally designates an ultrasonic thickness measuring system constructed in accordance with the principles of this invention. The system is usable either with a dual transducer unit 11, shown connected in FIG. 1, or a single transducer unit 12 shown in FIG. 2. The dual transducer unit 11 comprises a sending transducer 13 and a receiving transducer 14 mounted on wedge members 15 and 16 engageable with a front surface 17 of a part 18. Ultrasonic bursts from the transducer 13 are transmitted through the wedge 15 and into the part 18 to be reflected from an opposite or back surface 19 of the part and to travel through the part and the wedge 16 to the receiving transducer 14. The transducers 13 and 14 are respectively connected to terminals 21 and 22 which are connected to the output of a pulser 23 and the input of a receiver 24. The system operates to measure the time interval between the operation of the pulser 23 and the receipt of the echo signal from the reflection from the back surface 19 and to develop a digital indication of the thickness of the part 18.

The unit 12 comprises a single transducer 25 which may be placed against the front surface 17 of the part 18 and which may be connected to the terminal 21 as shown in FIG. 2. When the unit 12 is used, ganged contacts of a "Single-Dual" selector switch 26 are moved to positions opposite those illustrated, and two contacts 27 and 28 thereof then function to connect the output of pulser 23 and the input of the receiver 24, so that both are connected to the transducer 25.

In using the system, the operator connects either the dual transducer unit 11 or the single transducer unit 12 and positions the "Single-Dual" switch 26 accordingly. He then closes a power supply switch 30 to connect a battery 31 to a power supply unit 32 and the dual transducer unit 11 or the single transducer unit 12 may be placed against a part to be measured. In a fraction of a second, a digital output indication is obtained on a counter and read-out unit 33. As diagrammatically illustrated, the read-out unit 33 has three indicator devices 34, 35 and 36 each of which may be energized to display the numerals 0 through 9, and two decimal point indicators 37 and 38 which are respectively positioned to the left of device 34 and to the left of device 35. Energization of the decimal point indicators 37 and 38 is controlled by a contact 39 of a "Thin-Thick" switch 40 which has a second contact 41 controlling the frequency of pulses applied from an oscillator unit 42 to the counter and read-out unit 33. In the "Thin" position as illustrated, the frequency of the applied pulses is ten times the frequency of the applied pulses in the "Thick" position. The decimal point indicators 37 and 38 are respectively energized in the "Thin" and "Thick" positions.

By way of example, if a part is measured with switch 40 in the "Thin" position as illustrated, having a thickness of 0.473 inch, the numerals 4, 7 and 3 will be displayed by the devices 34, 35 and 36, respectively, and the decimal point indicator 37 will be energized. If the same part is measured with the switch 40 in the "Thick" position, the numerals 0, 4 and 7 will be displayed by the devices 34, 35 and 36, respectively, with decimal point indicator 38 being energized. If a part having a thickness of 1.473 inches is measured with the switch 40 in the "Thin" position, the indications will be the same as for a part having a thickness of 0.473 inch. However, if a part having a thickness of 1.473 inches is measured with switch 40 in the "Thick" position, the numerals 1, 4 and 7 will be displayed by the devices 34, 35 and 36 with the decimal point indicator 38 being energized. Thus in measuring thicker parts, the foruth digit can be determined by switching to the "Thin" position. It will be understood, of course, that more than three digital indicators and higher frequencies can be employed to obtain the desired degree of accuracy.

In addition to the "Thin-Thick" switch 40, a "Fast-Slow" switch 43 is provided which is illustrated in its "Fast" position and which switched to its "Slow" position reduces the frequency of pulses applied to the counter and read-out unit 33 by a factor of two. This feature is desirable in various circumstances. For example, when parts of a material having a slow speed of propagation of ultrasonic waves are measured, such as plastics and some metals, the switch 43 may be positioned in its "Slow" position and more accurate calibration can be obtained. It is noted that as hereinafter described in more detail, the system is calibrated through the use of a part or parts of known thickness and of the same material as the material of parts to be measured.

The system is controlled from a clock 45 which supplies pulses at a frequency of 250 Hz. at a terminal 46 and a squarewave having a frequency of approximately 4 Hz. at a terminal 47. More precisely, the frequency of the squarewave is 250 divided by 16 or 3.90625 cycles, but is it hereinafter referred to as a 4 Hz. squarewave for convenience. It will be understood that the specific frequencies referred to herein as well as the types and values of circuit components, voltages, etc. are given by way of illustrative example and not by way of limitation.

The 250 Hz. pulses are applied to a clock delay circuit 48 which produces delayed pulses at the same frequency, the delay being somewhat less than the time interval between pulses. Thus the output pulses from the delay circuit 48 may be considered as being in leading relation to the 250 Hz. pulses from the terminal 46.

Both the 250 Hz. pulses and the 4 Hz. squarewave are applied to a gate circuit, hereinafter referred to as a "burp" gate, which has a third input connected through a line 51 to a logic circuit 52 to prevent operation of the burp gate 50 during the counting and read-out operation, as hereinafter described.

When the 4 Hz. squarewave signal goes positive, the 250 Hz. pulses are applied to a pulser delay circuit 53 which after a certain delay produces an output pulse which is applied to the pulser 23. Pulser 23 then applies a pulse to the transmitting transducer 13 to send a burst of ultrasonic energy into the front surface 17 of the part 18. The pulser delay circuit 53 is reset by a pulse from the delay circuit 48 before the next input pulse is applied to the pulser delay circuit 53.

The output pulses from the pulser delay circuit 53 are also applied to a wedge delay circuit 54 which develops an output signal after a certain time interval which is adjustable by a potentiometer 55. The wedge delay circuit output signal is applied to a fixed contact of the "Single-Dual" switch 26 which in the "Dual" position as illustrated is connected through a movable contact 56 of the switch 26 to a line 57 connected to the logic circuit 52. The wedge delay output signal is also applied to the receiver 24 to enable circuits in the receiver 24 to respond to echo pulses.

The receiver 24 includes an automatic gain control circuit and operates at maximum gain to amplify the first echo signal following the first transmitted pulse after the 4 Hz. signal goes positive to enable the burp gate 50. The automatic gain control circuit of the receiver 24 then functions to reduce the receiver gain and in response to echo signals following subsequent transmitted pulses, the receiver gain is further reduced. Eventually, the receiver gain settles down to a stable value. This may take place after 50 transmitted pulses, for example, the number being widely variable and being dependent upon various factors including the amplitude of the pulser output, the character of the transmitting and receiver transducers, the coupling between the transducers and the part, the attenuation characteristics of the part and the boundary conditions at the back surface 19 of the part.

The equilibrium gain condition is detected by a settle detector circuit 58 which applies an output signal through a line 59 to the logic circuit 52. When this signal is applied, the logic circuit responds to the next signal applied through line 57 (derived from the wedge delay circuit 54 in the dual transducer mode of operation) to apply a signal to a gate circuit 60 and to cause application of pulses from oscillator unit 42 to the counter and read-out unit 33. At the same time, a signal is applied from the logic circuit 52 through a line 61 to an up-down integrator circuit 62. As hereinafter described, the charging of a capacitor in the circuit 62 is then initiated.

When an echo pulse from the back surface 19 of the part 18 is received by the receiving transducer 14, an echo signal is applied from the output of the receiver 24 through a line 63 to the logic circuit 52 which then applies a signal through a line 64 to the up-down integrator circuit 62. The charge of the capacitor in the integrator circuit 62 is then discontinued and the capacitor discharges at a rate much slower than the charging rate until discharged to a certain point. At this time, a signal is applied from the up-down integrator circuit 62 through a line 65 to the logic circuit 52 which then functions to close the gate 60 and to prevent further application of pulses to the counter and read-out circuit 33.

Numbers are then displayed by the devices 34, 35 and 36 which provide a highly accurate indication of the thickness of the part. It is noted that through the operation of the automatic gain control circuit of the receiver 24 in conjunction with the settle detector 58 and the logic circuit 52, the amplitude and wave shape of the echo pulses are stabilized so as to be substantially independent of variables such as variations in the amplitude of the pulser output, the character of the transmitting and receiving transducers, the coupling between the transducers and the part, the attenuation characteristics of the part, the boundary conditions at the back surface 19 and the like so that the high degree of accuracy can be obtained. Accuracy is further increased through the use of the up-down integrator circuit 62 which in effect multiplies the time interval between the pulsing of a transducer and the receipt of an echo signal by a fixed factor and through the digital counting of pulses, a high degree of accuracy can be obtained without requiring the use of extremely high speed counting circuitry.

The indication is retained by the counter and read-out unit 33 until another sequence of operation takes place as above described, before which time a reset signal is applied from the logic circuit 52 through a line 66 to the counter and read-out unit 33.

As shown in FIG. 1A, the output signal from the logic circuit 52 may be also applied to an integrator circuit 66 to develop a DC signal having a magnitude proportional to the duration of the output signal. The DC signal so developed may be applied to a meter 66a and to a pre-set voltage comparator 66b operative to energize one indicator 66c when the magnitude of the DC signal exceeds a certain value or to energize an indicator 66d when the magnitude is less than a certain value.

As shown in FIG. 1B, the pulses from the gate 60 may also be applied to a counter circuit 66e operative to count up to a certain number of pulses which may be adjustably pre-set. If the number of pulses exceeds the pre-set number, an indicator 66f is energized and if the number of pulses is less than the pre-set number, an indicator 66g is energized.

The settle detector 58 also applies a signal through a line 67 to the power supply unit 32. In the event that measurement pulses are not developed, as for example when the transducer unit is not engaged with a part, the supply of power from the power supply unit 32 to the counter and read-out unit 33, through lines 68 and 69, is cut off so as to prevent drain of current from the battery 31. It is also noted that through the use of the "burp" arrangement as above described, the current is applied to the major portion of the circuitry only for a fraction of the time so as to further conserve battery power. These features are important in that the system can be embodied in a portable instrument and digital circuits which require substantial amounts of current for operation can be used to obtain a high degree of accuracy, without requiring the use of large batteries or continual recharging or substitution of batteries.

The operation is described above in conjunction with the Dual transducer mode of operation. In the Single transducer mode of operation, wherein the Single transducer unit 12 is connected as shown in FIG. 2, the selector switch 26 is moved to a position opposite that illustrated. A contact 70 of the switch 26 then functions to disconnect a capacitor in the wedge delay circuit 54 to reduce the delay time and to permit the receiver 26 to be operative sooner to respond to echo pulses. In addition, the switch contact 56 is moved to a position opposite that illustrated, to connect the line 57 to the output of a count start delay circuit 71 having an input connected to the output of the burp gate 50. The circuit 71 responds to a pulse from the output of the burp gate 50 to produce a delayed signal after a time interval which may be adjusted by adjustment of a potentiometer 72, and is reset by a signal from the clock delay circuit 48 prior to the application of a subsequent pulse from the burp gate 50. Potentiometer 72 is so adjusted as to produce an output pulse at a time corresponding to the entry of a transmitted burst into the front surface 17 of the part 18, so that the time of reception of an echo from the back surface 19 provides an accurate indication of the thickness of the part. It is noted that in the dual transducer mode of operation, the potentiometer 55 of the wedge delay circuit 54 is so adjusted as to provide an additional time delay, compensating for the time required to pass through the wedge blocks 15 and 16.

For calibration of the system, a terminal 73 of the up-down integrator circuit 62 is connected through adjustable resistors 75 and 76 to fixed contacts of the switch 26 which are respectively engaged by a movable contact 77 in the "Single" and "Dual" positions, contact 77 being connected to a terminal 78 of the circuit 62. A contact 79 is provided for connecting an additional capacitor in the up-down integrator circuit 62 in the "Single" position of the switch 26.

The power supply unit 32 supplies an appropriate supply voltage through line 80 to the pulser 23, voltages of +200 and +5 through lines 68 and 69 to the read-out circuit 33, and voltages of +12, +5 and −12 volts on lines 81, 82 and 83 to the up-down integrator circuit 62 and to other circuits as indicated. In addition, a 1 kHz. oscillator is incorporated in the power supply unit 32 which is connected through a line 84 to the clock circuit 45. It will be understood that the specific voltages and frequencies set forth above and hereinafter are given by way of illustrative example and not by way of limitation.

FIG. 3 illustrates the circuitry of the clock circuit 45 and the clock delay circuit 48. The 1 kHz. signal applied through line 84 from the power supply unit 32 is applied to an input terminal of an integrated circuit 86 having two divide-by-two or bistable circuits 87 and 88 connected in cascade with a 250 Hz. signal from the section 88 being applied to another integrated circuit 90 also having two bistable circuits 91 and 92 connected in cascade, the output of section 92 being connected to the output terminal 47. Additional terminals of the integrated circuits 86 and 90 are connected to ground and to the power supply line 82 through isolation networks formed by resistors 93 and 94 and capacitors 95 and 96. An output terminal of the section 88 is connected to the terminal 46 to develop a 250 Hz. signal thereat, terminal 46 being connected through an inverter 97a to one input terminal of an AND gate 97, additional terminals of the AND gate 97 being connected to terminals of the section 87, at which a 500 Hz. signal is developed and to the line 84. The output of the AND gate 97 is applied to an input terminal of an integrated circuit 98 which is connected to operate as a one-shot or monostable multivibrator. The time of operation of the multivibrator 98 is controlled by the values of resistors 99 and 100 and capacitors 101 and 102 connected thereto, the circuit being connected to ground and the power supply line 82 through an isolation network formed by capacitor 103 and resistor 104. As above indicated, the circuit provides a delay which is somewhat less than the time interval between the 250 Hz. pulses.

Figure 4:
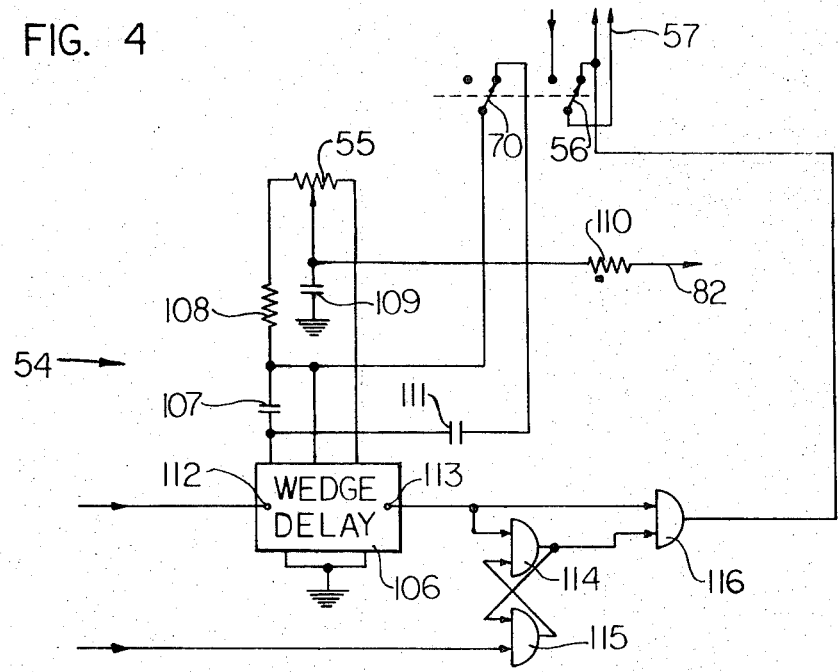
FIG. 4 is a diagram of a wedge delay circuit of the system of FIG. 1.

Referring to FIG. 4, the wedge delay circuit 54 comprises an integrated circuit 106 operable as a one-shot or monostable multivibrator with external timing circuitry including a capacitor 107 and the potentiometer 55 having an end terminal connected through a resistor 108 to the capacitor 107, with the movable contact and opposite terminal of the potentiometer 55 being connected through a capacitor 109 to ground and through a resistor 110 to the power supply line 82. An additional capacitor 111 is connected in parallel with the capacitor 107 by means of a contact 70 in the dual transducer mode of operation. In operation, a negative going signal applied to an input terminal 112 of the circuit 106 causes the potential of an output terminal 113 to shift in a negative direction which sets a flip-flop formed by two gates 114 and 115 having cross-connected input and output terminals, the output terminal of gate 114 being connected to one input terminal of a gate 116. After a certain time interval determined upon the adjustment of the potentiometer 55 and dependent upon whether or not the capacitor 111 is connected, the potential of the output terminal 113 of the circuit 106 shifts in a positive direction to cause the potential of the output terminal of the gate 116 to shift in a negative direction. The output of gate 116 is applied to the receiver 24 and, in the dual transducer mode of operation, to the logic circuit 52.

The output signal of the circut 54 remains positive until a clock pulse is applied from the output of the clock delay circuit 48 to an input of the gate 115, which resets the flip-flop formed by gates 114 and 115. The pulser delay circuit 53 and the count start delay circuit 71 are substantially the same as the wedge delay circuit 54, except in the use of different component values, except that the pulser delay circuit 53 is not adjustable and except that the pulser delay circuit 53 does not incorporate an inverter corresponding to the inverter 117, the output of the gate of the pulser delay circuit which corresponds to the delay to the gate 116 of the wedge delay circuit is connected directly to the input terminal 112 of the circuit 106. In the pulser delay circuit 53, the output terminal corresponding to the terminal 113 of the wedge delay circuit is connected to the pulser 23.

FIG. 5 is a block diagram of the circuit of the receiver 24. Signals from the transducer 14 in the dual transducer mode of operation or from the transducer 25 in the single transducer mode of operation are applied to a variable gain amplifier 120 the output of which is applied to two monostable or one-shot multivibrators 121 and 122. The multivibrators 121 and 122 have terminals 123 and 124 connected to the output of the wedge delay circuits 54 and are disabled from a time preceding the operation of the pulser 23 to a certain time after the operation of the pulser 23, so that the one-shot multivibrators 121 and 122 are operated only in response to echo pulses received from the back surface of a part. In response to each echo pulse, the one-shot multivibrators 121 and 122 develop pulses having a certain duration, pulses from the multivibrator 121 being applied through line 63 to the logic circuit 52 and pulses from the multivibrator 122 being applied to the input of the settle detector 58. Pulses from the multivibrator 122 are also applied to an integrator circuit 125 the output of which is applied through a DC amplifier 126 to the amplifier 120 to control the gain thereof.

The multivibrators 121 and 122 have input circuits so arranged that they are triggered only in response to pulses above a certain level, the level of input pulse required for operation of the multivibrator 121 being a fraction of the level required for operation of the multivibrator 122. For example, the level at which the multivibrator 121 operates may be from 60 to 80% of the level at which the multivibrator 122 operates.

In operation, the amplifier 120 is initially operated at maximum gain. Pulses developed by the multivibrator 122 are integrated by the integrator circuit 125 and applied through the DC amplifier 126 to reduce the gain of the amplifier 120. After reception of a certain number of pulses, the gain of the amplifier 120 is reduced to an extent such that the output pulses therefrom will not trigger the multivibrator 122. At this point, the output pulses from the amplifier 120 have a certain amplitude dependent upon the level setting of the multivibrator 122, which amplitude is independent of various operating conditions. The multivibrator 121 will then be triggered at a certain point during the output pulse from the amplifier 120, and the time of triggering is substantially independent of variations in the amplitude of the input pulses. As a consequence, an extremely accurate determination of the timing of the echo pulse is accomplished.

FIG. 6 shows the circuits of the one-shot multivibrator 122 and the integrator circuit 125. Signals from the output of the amplifier 120 are applied through a capacitor 128 and through the parallel combination of a capacitor 129 and a resistor 130 to the base of a transistor 131 which is connected through a resistor 132 to ground. The emitter of the transistor 131 is connected through a resistor 133 to the collector of a transistor 134 having a grounded emitter and having a base connected through a resistor 135 to ground and through a resistor 136 to the terminal 124 which is connected to the output of the wedge delay circuit 54. When a positive signal is applied from the wedge delay circuit, the transistor 134 is rendered conductive to permit operation of the multivibrator circuit. The collector of the transistor 131 is connected through a resistor 137 to the power supply line 81 and is also connected through a capacitor 138 to the base of a transistor 139 which is connected through a resistor 140 to the line 81. The emitter of transistor 139 is connected to the line 81 while the collector thereof is connected through a resistor 141 to ground and through a capacitor 142 to the base of a transistor 143 which is connected through a resistor 144 to ground.

In operation, the transistor 131 is normally non-conductive. When positive signals are applied from the output of the amplifier 120 having an amplitude above a certain level and when a positive signal is applied to the base of the transistor 134 from the output of the wedge delay circuit 54, the transistor 131 conducts and a negative-going signal is applied from the collector thereof to the base of the transistor 139 to cause transistor 139 to conduct heavily, thereby developing a positive pulse at the collector thereof which is coupled though the capacitor 142 to the base of the transistor 143, which then develops a negative pulse at its collector which is connected through a resistor 144a to the power supply line 82. The negative pulse so developed at the collector of the transistor 143 is applied to the input of the settle detector circuit 58. In addition, it is applied through a capacitor 145 to the base of a transistor 146 which is connected through a resistor 147 to the power supply line 81. The emitter of the transistor 146 is connected to the line 81 while the collector thereof is connected through a resistor 148 to ground and through a capacitor 149 to the base of a transistor 150 which is connected through a resistor 151 to ground. The collector of the transistor 150 is connected to the line 81 while the emitter thereof is connected through a resistor 152 to ground and through a diode 153 to a circuit point 154 which is connected to ground through a capacitor 155 and also through a resistor 156 and a diode 157 in series. In operation, negative pulses applied from the collector of the transistor 143 through the capacitor 145 to the base of the transistor 146 develop positive pulses at the base of the transistor 150 operated as an emitter-follower. Positive pulses developed at the emitter of transistor 150 are applied through the diode 153 to charge the capacitor 155. The resistor 156 has a relatively high value and permits discharge of the capacitor 155 but at a relatively slow rate. When a series of pulses are applied, the charge of the capacitor 155 gradually builds up.

Through the DC amplifier 126, the increasing output of the integrator circuit 125, developed at the circuit point 154 is applied to the variable grain amplifier 120 to reduce the gain thereof.

The monostable or one-shot multivibrator 121 has a circuit which is substantially identical to that of the multivibrator 122, except that the resistor in the circuit 121 which corresponds to the resistor 132 has a value substantially higher than that of the resistor 132, thereby permitting the multivibrator 121 to operate in response to input signals of lower amplitude.

FIG. 7 illustrates the circuit of the settle detector 58. The negative pulses from the output of the one-shot multivibrator 122 of the receiver 24 are applied through to a flip-flop formed by two gates 159 and 160 having cross-connected input and output terminals. Output terminals of the gates 159 and 160 are applied to J and K inputs of J–K flip-flop 161, the outputs of which are connected to a second J–K flip-flop 162. The flip-flops 161 and 162 are preferably in a single integrated circuit unit connected to ground and the power supply line 82 with an isolation network formed by capacitor 163 and resistor 164. Clock pulses from the clock delay circuit 48 are applied to C inputs of the flip-flops 161 and 162 which are operated as shift register stages. A reset input of the flip-flop formed by gates 159 and 160 is connected to the 250 Hz. output of the clock circuit 45. The Q and Q outputs of the flip-flops 161 and 162, respectively, are connected to inputs of an AND gate 166 and the output of which is connected directly to the lines 59 and 67.

In operation, the Q and Q outputs of the flip-flops 161 and 162 are both high only when no pulse is applied to the input of the gate 159 from the multivibrator 122 of the receiver 24 following a time when a pulse has been applied.

The output of the gate 166 is applied through the line 67 to the power supply unit 32 to cut off the supply of power to the counter and read-out unit 33 when signals from the settle detector circuit are not developed during successive burp cycles which may take place, for example, when the transducer is not engaged with a part. Thus drain on the battery is minimized. The output of the gate 166 is also applied through line 59 to the logic circuit 52 to cause initiation of a measuring, counting and read-out operation.

FIG. 8 is a diagram of the logic circuit 52. The signal developed at the output of the gate 166 of the settle detector 58 is applied through the line to inputs of two gates 169 and 170. Both gates 169 and 170 have inputs connected to the line 51 which applies a signal indicating whether or not a reading operation is taking place. A third input of the gate 169 is connected to the output of the burp gate 50 and after a signal is applied from the settle detector 58 and the settle detector 58 is in the condition in which a reading operation is to be initiated, the circuitry is in condition for the initiation of a reading operation. The next signal from the inverter 167 causes the application of a signal from the output of the gate 169 to the line 66 to reset the counter and read-out unit 33. A third input of the gate 170 is connected to the line 57 which is connected through the contact 56 either to the output of the wedge delay circuit 54 or to the output of the count start delay circuit 71. Thus under the same conditions set forth above, a signal from either the wedge delay circuit 54 or the count start delay circuit 71 causes the application of a signal from the output of the gate circuit 170 to a bistable circuit formed by two flip-flops 173 and 174 having cross-connected input and output terminals, the flip-flop being then placed in a "Set" condition. A reset input of the flip-flop is connected to the output of an OR gate 176. One input of the OR gate 176 is connected through the line 63 to the output of the receiver 24 so that upon receipt of an echo pulse, the flip-flop formed by gates 173 and 174 is reset. The other input of the OR gate 176 is connected to the terminal 46 of the clock circuit 45 for the purpose of insuring that the flip-flop will be reset prior to the next transmitted pulse, in the event that no echo pulse is received.

An output of the gate 173 is connected to a "Set" input of a flip-flop formed by gates 177 and 178 having cross-connected inputs and outputs. An input of the gate 178, forming a "Reset" input, is connected to the 4 Hz. output terminal 47 of the clock circuit 45. The output terminal of the gate 178 is connected to the line 51 to prevent the development of signals at the outputs of the burp gate 50 and the gates 169 and 170 when a reading operation is taking place and until the following positive cycle of the 4 Hz. squarewave.

The output of the gate 173 is also connected to a "Set" input of a flip-flop formed by a pair of gates 179 and 180, the output of the gate 179 being applied to the count gate 60. Following the application of a signal from the settle detector 58 as above described, a signal from either the wedge delay circuit 54 or the count start delay circuit 71 causes the flip-flop formed by gates 173 and 174 to be set which then sets the flip-flop formed by gates 179 and 180, the gate 60 being then operative to apply pulses derived from the oscillator 42 to the counter and read-out unit 33. The flip-flop formed by gates 179 and 180 is reset by a signal derived through line 65 from the up-down integrator circuit 62 as hereinafter described, the integrator circuit 62 being effective to cause the gate 60 to be operative for a time interval directly proportional to but of substantially greater duration than the time interval between the transmission of a burst of ultrasonic energy into the front surface 17 of the part 18 and the reception of the signal at the front surface 17 after reflection from the back surface 19.

The logic circuit 52 further includes a gate 181 which has inputs connected to the output of the gate 173, the output of the gate 179 and the line 65. When the flip-flop formed by gates 173 and 174 is reset in response to an echo received after reflection from the back surface of the part, a signal is applied from the output of the gate 181 to the up-down integrator 62 to initiate a "down" operation thereof as hereinafter described.

FIG. 9 is a circuit diagram of the up-down integrator circuit 62. The circuit 62 comprises a capacitor 183 which in an "up" portion of the operation, is charged from a constant current source to a certain value and which during a "down" portion of the operation is discharged through a constant current device. The voltage to which the capacitor 183 is charged during the "up" portion of the operation is proportional to the thickness of the part and since the capacitor 183 is discharged at a constant rate, the time required for discharge to a certain level is also proportional to the thickness of the part. Accordingly, the total time from the beginning of the "up" portion of the operation to the end of the "down" portion of the operation is proportional to the thickness of the part. This total time interval is several times larger than the duration of the "up" portion of the operation (which is equal to the time interval between transmission of a burst into the front surface 17 of the part and the receipt of the echo at the front surface after reflection from the back surface 19), the rate of discharge of the capacitor 183 being a small fraction of the rate of charge thereof.

It is noted that in the dual transducer mode of operation, in which relatively thin parts are measured, the capacitor 183 is used alone. In the single transducer mode of operation, wherein thicker parts are measured, a capacitor 184 is connected through the contact 79 of the switch 26 between power supply line 83 (to which a voltage of −12 volts may be applied) and a circuit point 187, capacitor 183 being connected between circuit point 187 and ground. By way of example and not by way of limitation, the capacitor 183 may have a value of 0.047 microfarad, while the capacitor 184 may have a value of 0.1 microfarad. In the dual transmission mode, parts as thin as 50 thousandths of an inch or even smaller may be measured while in the single transducer mode, parts as thick as 4 inches or even larger may be measured.

To provide a constant current source for capacitor charging, a transistor 188 is provided having a collector connected through a diode 189 to the circuit point 187, having an emitter connected through a resistor 190 to the power supply line 81 and having a base connected through a resistor 191 to ground and also through a Zener diode 192 to the line 81. Except in the "up" portion of the operation, the collector of the transistor 188 is clamped at a potential approximately equal to ground potential so that no capacitor charging operation takes place. During the "up" portion of the operation, the clamp is removed, to permit charging at a constant current rate though the transistor 188. In particular, the collector of the transistor 188 is connected through a diode 193 to the collector of a transistor 194 which is connected through a resistor 195 to the line 83 and also through a pair of diodes 196 in series to ground. With no conduction through the transistor 194, current flows from the line 81 through resistor 190, transistor 188, diode 193 and resistor 195 to the line 83 the diodes 196 serving to maintain the potential of the collector of transistor 194 only slightly below ground potential. Under such conditions, no current flows through the diode 189. The emitter of transistor 194 is connected through a Zener diode 197 to the power supply line 81 and through a resistor 198 to ground while the base thereof is connected through a resistor 199 to the line 81 and through a resistor 199a to a circuit point 199b which is connected through a Zener diode 199c to ground and through a resistor 199d to the line 61. During the "up" portion of the operation, a negative signal is applied through the line 61 and resistors 199d and 199a to the base of the transistor 194 to cause the transistor 194 to conduct and to place the collector thereof at a potential close to that of the emitter thereof, which may be plus 5 volts. Under such conditions, no current flows through the diode 193 and current flows at a constant rate from the line 81 through transistor 188 and diode 189 to the circuit point 187, to change the potential of the circuit point 187 at a linear rate through charging of the capacitor 183 alone, in the dual transducer mode, or through charging of both the capacitor 183 and the capacitor 184 in the single transducer mode.

At the end of the "up" portion of the operation, the negative signal on line 61 is removed to cut off conduction through the transistor 194 and to again clamp the potential of the collector of the transistor 188 at approximately ground potential, so as to prevent further conduction through the diode 189.

During the "down" portion of the operation, capacitor discharge is effected at a constant rate. For this purpose, a transistor 200 is provided having a collector connected through a diode 201 to the circuit point 187 and having a base connected through a resistor 202 to ground and through a Zener diode 203 to the line 83. The emitter of the transistor 200 is connected through a resistor 204 to the contact 77 of the single-dual switch 26 which is connected either through the variable resistor 75 or the variable resistor 76 to the line 83. During the "down" portion of the operation, current flows from the circuit point 87 through the diode 201, transistor 200, resistor 204 and either variable resistor 75 or variable resistor 76 to the line 83 at a fixed rate dependent upon the position of the contact 77 and the adjustment of the variable resistor 75 or the variable resistor 76.

Except during the "down" portion of the operation, the collector of the transistor 200 is clamped at a potential above ground potential to prevent current flow through the diode 201 and to prevent capacitor discharge. In particular, the collector of the transistor 200 is connected through a diode 205 to a circuit point 206 which is connected through a Zener diode 207 to ground, through a resistor 208 to the line 81 and through a resistor 209 to the collector of a transistor 210. The emitter of the transistor 210 is connected through a diode 211 to the line 83. The base of the transistor 210 is connected through a resistor 212 to the line 83 and through a resistor 213 to the collector of a transistor 214 having an emitter connected through a resistor 215 to the line 82 and having a base connected to the line 64 and also through a resistor 216 to the line 82.

Except during the "down" portion of the operation, the transistor 210 is non-conducting so that the potential of the circuit point 206 is relatively high and the potential of the collector of the transistor 200 is high enough to prevent current flow through the diode 201 and to prevent capacitor discharge. During the "down" portion of the operation, a negative signal is applied through line 64 to the base of the transistor 214 to render the transistor 214 conducting and to thereby also render the transistor 210 conducting so that the potential of the circuit point 206 is dropped to a value such that the diode 205 does not conduct and discharge current flows through the diode 201 and transistor 200 as above indicated.

The "down" portion of the operation is terminated when the potential of the circuit point 187 reaches a "crossover" level, approximately equal to ground potential, which is sensed by a cross-over detector circuit generally designated by reference numeral 218. The cross-over detector circuit 218 is so arranged as to be operative only during the "down" portion of the operation which is important in that it might otherwise respond during the "up" portion of the operation to produce false indications and unsatisfactory results. In particular, the crossover detector circuit 218 comprises a control circuit in the form of a one-shot multivibrator including two transistors 219 and 220 having collectors connected through resistors 221 and 222 to the line 83 and cross-connected to the base electrodes through capacitors 223 and 224. The base of the transistor 219 is connected to the circuit point 187 while the base of the transistor 220 is connected through a resistor 225 to ground and through a resistor 226 to the line 82. The emitters of the transistors 219 and 220 are connected together and through a resistor 227 to the collector of a transistor 228 the emitter of which is connected to the line 82. The base of transistor 228 is connected through a resistor 229 to the line 81 and through a resistor 230 to the line 64.

In operation, a negative signal is applied from line 64 during the "down" portion of the operation to render the transistor 228 conductive which causes the transistor 220 to conduct heavily with the transistor 219 being cut off. It is noted that the values of resistors 225 and 226 are such that the potential of the base of the transistor 220 is below that of the potential of the base of the transistor 219. As the capacitor 183 or the capacitors 183 and 184 are discharged the potential of the circuit point 187 gradually drops until it is below that of the emitter of the transistor 219. The transistor 219 then will start to conduct whereupon conduction through the transistor 220 will be reduced to increase conduction through the transistor 219, and so on. In a very short interval of time, the transistor 219 will conduct heavily while the transistor 220 will be cut off.

With transistor 219 rendered highly conductive, a positive signal is developed at the collector thereof which is applied through a capacitor 231 and a resistor 232 to the base of a transistor 233, the base of transistor 233 being connected through a resistor 234 and a diode 236 to ground. The emitter of transistor 233 is connected to ground while the collector thereof is connected to the line 65 and through a resistor 237 to the line 82. With a positive signal applied to the base of the transistor 233, a negative-going signal is developed at the collector thereof which is applied through the line 65 to the flip-flop formed by the gates 179 and 180, which is then reset. Through the gate 181, the "down" signal on line 64 is removed which cuts off conduction through the transistor 228 and the multivibrator transistors 219 and 220 are rendered non-conductive.

The removal of the "down" signal on line 64 also renders transistor 214 non-conductive which in turn renders transistor 210 non-conductive which raises the voltage of circuit point 206 sufficiently to render diode 201 non-conductive, thus terminating the discharge of capacitor 183 in the dual mode, or of both capacitors 183 and 184 in the single mode.

Referring to FIG. 10, the oscillator unit 42 comprises an oscillator 240 having a power input terminal connected through a capacitor 241 to ground and through a resistor 242 to the power supply line 82. Oscillator 240 may, for example, supply pulses at a frequency of 12.5 mHz. at an output terminal which is connected to a fixed contact 243 of the fast-slow switch 43 which is engaged by a movable contact 244 in the "fast" position. Contact 244 is connected to a fixed terminal of the thin-thick switch 40 to be engaged by the contact 41 in the "thin" position.

The output of the oscillator 240 is also connected to an input terminal of an integrated circuit 245 forming a divide-by-two circuit. The circuit 245 has a power input terminal connected through a capacitor 246 to ground and through a resistor 247 to the power supply line 82. Output pulses from the circuit 245, which may be at a frequency of 6.25 mHz. are applied to a contact 248, engaged by the contact 244 in the "slow" position of the switch 43. Output pulses from the circuit 245 are applied also to an integrated circuit 250 which comprises a divide-by-five section 251 and a divide-by-two section 252 in cascade. A power input terminal of the circuit 250 is connected through a capacitor 253 to ground and through a resistor 254 to the line 82. Output pulses from the divide-by-five section 251, which may be at a frequency of 1.25 mHz., are applied to a fixed contact 255 of the fast-slow switch 43 engaged by a movable contact 256 in the "fast" position. Contact 256 is connected to a contact of the thin-thick switch 40 to be engaged by the contact 41 in the "thick" position thereof. Output pulses from the divide-by-two section 252, which may be at a frequency of 625 kHz., are applied to a contact 257 engaged by the contact 256 in the "slow" position of the switch 43.

With regard to circuit values, the values of certain components in the up-down integrator circuit 62 are important. By way of example and not by way of limitation, the capacitor 183 may have a value of 0.047 microfarad while the capacitor 184 may have a value of 0.1 microfarad. The value of the resistor 190, the characteristics of the transistor 188, the voltage rating of the Zener diode 192 and the applied voltage on line 81 may be such as to obtain a charging current of approximately 10 milliamperes, while the values and characteristics of the discharge circuit including transistor 208 may be such as to obtain a discharge current of approximately 1 milliampere with resistor 75 or resistor 76 at its maximum setting. Under such conditions, the up-down integrator circuit multiples the time interval by a factor of 11, and it may be adjusted to multiply by a factor down to 3 or less. As above indicated resistors 75, 76 may be adjusted to obtain the proper readings from test pieces of known thickness and of the same material as the test pieces to be measured.

It will be understood that modifications and variations may be effected without departing from the spirit and scope of the novel concepts of this invention.

We claim as our invention:

1. In an ultrasonic measuring system, transmitting and receiving means for transmitting bursts of ultrasonic energy into a part and for developing received signals in response to said bursts after travel in said part, means for supplying a timing signal synchronized with the transmission of a burst into said part, and integrator circuit means responsive to said timing signal and the corresponding received signal for producing a control signal having a duration directly proportional to and at least several times larger than the time between said timing signal and said corresponding received signal, and time interval measuring means for measuring the duration of said control signal.

2. In an ultrasonic measuring system as defined in claim 1, said time interval measuring means comprising means for supplying pulses at a fixed frequency, digital counter means, gate means for applying said fixed frequency pulses to said counter means, and means for applying said control signal to said gate means to apply said fixed frequency pulses to said counter means for the duration of said control signal.

3. In an ultrasonic measuring system as defined in claim 1, said integrator circuit comprising capacitor means having an initial condition of charge, charging means for charging said capacitor means during the time interval between said timing signal and said corresponding received signal, discharging means for thereafter discharging said capacitor, and detector means for detecting when said capacitor means is charged to said initial condition.

4. In an ultrasonic system as defined in claim 3, switch means for selectively changing the effective capacitance of said capacitor means.

5. In an ultrasonic system as defined in claim 3, said charging and discharging means being arranged to charge and discharge said capacitor means at substantially uniform rates with the discharge rate being substantially smaller than the charge rate.

6. In an ultrasonic system as defined in claim 5, said charging and discharging means including a pair of transistors operated as constant current control devices.

7. In an ultrasonic measuring system as defined in claim 3, said detector means comprising a control circuit, and means coupling said capacitor means to said control circuit to trigger said control circuit when said capacitor means is discharged to said initial condition.

8. In an ultrasonic measuring system as defined in claim 7, means for inhibiting operation of said control circuit except during a time interval following said received signal.

9. In an ultrasonic measuring system as defined in claim 1, said integrator circuit comprising a flip-flop for developing said control signal, means responsive to said timing signal for setting said flip-flop, and means for resetting said flip-flop after a time interval following said corresponding received signal proportional to the time interval between said timing signal and said corresponding received signal.

10. In an ultrasonic measuring system as defined in claim 1, a plurality of adjustable circuit elements, and means operative in different conditions of operation for controlling connection of said adjustable circuit elements in said integrator circuit means to obtain different ratios between the duration of said control signal and the time between said timing signal and said corresponding received signal in different conditions of operation.

11. In an ultrasonic measuring system as defined in claim 1, said time interval measuring means comprising integrator means for developing a DC signal having a magnitude proportional to the duration of said control signal.

12. In an ultrasonic measuring system as defined in claim 1, means for indicating when the duration of said control signal is different in one direction from a pre-set value.

13. In an ultrasonic measuring system as defined in claim 1, said transmitting and receiving means including a unit having a single transducer for both transmitting and receiving and a unit having a pair of transducers for respectively transmitting and receiving, and switch means including contacts for selective connection of said single and dual transducer units.

14. In an ultrasonic measuring system as defined in claim 13, said transmitting and receiving means including a source of clock pulses, a transducer pulser, means responsive to said clock pulses for energizing said pulser, said timing signal supplying means including a pair of delay circuits energized from said clock pulses, and said switch means including contacts for selective connection to said delay circuit.

15. In an ultrasonic measuring system as defined in claim 1, said transmitting and receiving means including a unit having a single transducer for both transmitting and receiving and a unit having a pair of transducers for respectively transmitting and receiving, switch means including contacts for selective connection of said single and dual transducer units, said integrator circuit comprising capacitor means having an initial condition of charge, charging means for charging said capacitor means during the time interval between said timing signal and said corresponding received signal, discharging means for thereafter discharging said capacitor, and detector means for detecting when said capacitor means is discharged to said initial condition, said switch means including contacts for selectively changing the effective capacitance of said capacitor means.

16. In an ultrasonic thickness measuring system, transmitting and receiving means for periodically transmitting bursts of ultrasonic energy into one surface of a part and for developing back reflection signals in response to bursts reflected back from the opposite surface of the part, variable gain amplifier means for amplifying said back reflection signals, gain control means including an integrator circuit for responding to the amplified back reflection signals to develop a gain control signal, means applying said gain control signal to said variable gain amplifier means to stabilize the amplitude of said amplified back reflection signals, settle detector means arranged to develop a control signal when the amplitude of said amplified back reflection signals is stabilized at approximately a certain level, and time interval measuring means responsive to said control signal to thereafter measure the timing of the next subsequent one of said back reflection signals in relation to the corresponding transmitted burst.

17. In an ultrasonic thickness measuring system as defined in claim 16, said gain control means further including a pulse-developing circuit triggered by amplified back reflection signals above a certain amplitude to apply output pulses of a certain duration to said integrator circuit.

18. In an ultrasonic thickness measuring system as defined in claim 17, said settle detector means comprising a detector circuit for developing said control signal when no output pulse is developed by said pulse-developing circuit following a cycle in which an output pulse was developed by said pulse-developing circuit.

19. In an ultrasonic thickness measuring system as defined in claim 18, said detector circuit comprising a two stage shift register, means for applying said output pulses from said pulse-developing circuit to said shift register, and means for applying clock pulses to said shift register at the rate of periodic transmission of said bursts.

References Cited
UNITED STATES PATENTS

| | | | |
|---|---|---|---|
| 3,041,872 | 7/1962 | Brown et al. | 73—67.9 |
| 3,372,576 | 3/1968 | Dory | 73—67.9 |

RICHARD C. QUEISSER, Primary Examiner

J. P. BEAUCHAMP, Assistant Examiner

U.S. Cl. X.R.

73—67.9